United States Patent [19]

Tokuhara et al.

[11] 4,429,353

[45] Jan. 31, 1984

[54] SCANNING ILLUMINATING DEVICE

[75] Inventors: Mitsuhiro Tokuhara, Chigasaki; Yu Yamada, Tokyo; Yukio Takemura, Kawasaki; Takeshi Kuwayama, Yokohama; Susumu Seto, Odawara, all of Japan

[73] Assignee: Canon Kabushiki Kaisha, Tokyo, Japan

[21] Appl. No.: 280,095

[22] Filed: Jul. 2, 1981

[30] Foreign Application Priority Data

Jul. 11, 1980 [JP] Japan .................................. 55-94777

[51] Int. Cl.³ ............................................ G03B 27/54
[52] U.S. Cl. .................................... 362/232; 362/239; 355/70; 355/8; 355/11; 355/37
[58] Field of Search ............... 362/232, 238, 239, 277, 362/281, 283, 297, 302, 306, 319, 346; 355/8, 11, 51, 55, 56, 57, 37, 67, 70, 84; 350/6.5

[56] References Cited

U.S. PATENT DOCUMENTS 4,358,199  11/1982  Isago ...................... 355/70

FOREIGN PATENT DOCUMENTS 54-100127  8/1979  Japan .

Primary Examiner—Donald P. Walsh
Attorney, Agent, or Firm—Fitzpatrick, Cell, Harper & Scinto

[57] ABSTRACT

This specification discloses a scanning illuminating device in a copying apparatus of the slit exposure type in which a movable slit area of an original is projected upon a movable photosensitive medium by a projection lens. The device is characterized in that light sources are fixed to the opposite end portions of the original surface with respect to the scanning direction, the magnification of the light source image becomes gradually greater at one end of the scanning direction and gradually smaller at the other end of the scanning direction, and imaging elements are moved in the scanning direction so that the illumination distribution on the original surface is formed so as to compensate for the loss of quantity of light of the projection lens due to the so-called cos biquadratic rule or the like to thereby enable copying of uniform density in the scanning direction.

4 Claims, 3 Drawing Figures

SCANNING ILLUMINATING DEVICE

BACKGROUND OF THE INVENTION

1. Field of the Invention

This invention relates to a scanning illuminating device in a copying apparatus or the like in which irregularity of illumination due to the so-called cosine biquadratic rule of the projection lens is compensated for and the light sources are fixed which construction is suited for high-speed copying.

2. Description of the Prior Art

In most of the scanning illuminating systems of slit exposure type copying apparatus, a light source follows a scanning mirror. However, movement of the light source offers a problem as to durability including the cord or the like and is not suitable for high-speed copying. Re-issued U.S. Patent Re. No. 29017 discloses an illuminating system of a copying apparatus in which a light source (spot light source) is fixed. However, this uses a parabolic mirror to collimate the effective light beam and always brings about uniform illumination on the original surface and therefore, when the loss of quantity of light of the projection lens due to the cosine biquadratic rule is taken into consideration, the quantity of light becomes deficient at the marginal portion of the scanning direction and copying of uniform density over the entire picture plane cannot be accomplished.

SUMMARY OF THE INVENTION

It is an object of the present invention to provide a scanning illuminating device in which light sources are fixed and there is formed an illumination distribution compensating for the loss of quantity of light of the projection lens due to the cosine biquadratic rule.

Such object is achieved by a construction in which imaging elements for projecting the fixed light sources upon the slit area of the original surface are provided in the light path of the illuminating system and the imaging elements are moved and therewith, mirrors are scanned to correct the length of the light path so as to maintain an imaging relation.

The invention will become more fully apparent from the following detailed description thereof taken in conjunction with the accompanying drawings.

DESCRIPTION OF THE PREFERRED EMBODIMENTS

Figure 1:
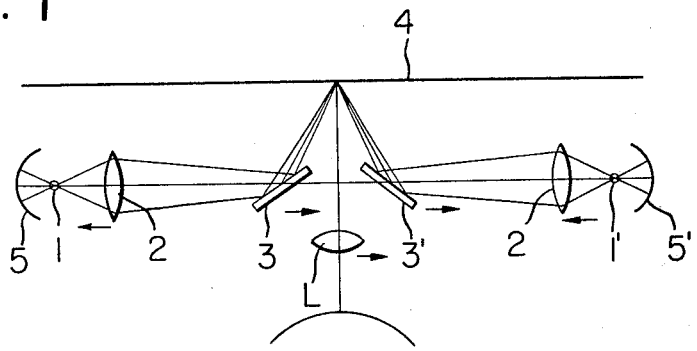
FIG. 1 is a schematic view illustrating the principle of the present invention and also showing a first embodiment of the present invention.

FIG. 1 is a schematic view illustrating the principle of the present invention and also showing a first embodiment of the present invention. The light from a cylindrically shaped light source 1 is projected upon an original surface 4 is a slit-like form by a lens 2 via a mirror 3. An auxiliary mirror 5 for returning the light beam to the light source 1 is provided behind the light source 1 to enable the light beam to be effectively used. When the lens 2 is moved in the direction of arrow, namely, in parallel with to the original surface 4, as it were, the object side distance is displaced and the mirror 3 is moved in the opposite direction so as to maintain the imaging relation and thereby correct the image side distance.

Let a be the object side distance, b be the image side distance, 1 be the distance between the object and its image, f be the focal length of the lens 2, and m be the magnification of the lens 2. Then, the following equations are established:

$$\frac{1}{a} + \frac{1}{b} = \frac{1}{f}$$

$$m = b/a$$

From these, $$a = f(1 + 1/m)$$

$$b = f(m+1)$$

$$1 = a + b = f(m + 1/m + 2)$$

If $m > 1$, as m becomes greater, a becomes smaller and 1 becomes greater.

Next, let Lo be the brightness of the original surface in the direction of the normal, Io be the light intensity in the direction of the normal, $\Delta S$ be the area on the original surface, and $\Delta S'$ be the area on the corresponding image plane. Then, the following equations are established:

$$Io = Lo \Delta S$$

$$\Delta S' = m^2 \Delta S$$

Further, let $\phi_o$ be the entire light beam to the lens, $\Omega$ be the solid angle subtending the lens from the object point, and F be the aperture number of the lens. Then, the following equations are established:

$$\phi_o = Io\Omega = Lo\Delta S \times \frac{\pi \left(\frac{D}{2}\right)^2}{a^2}$$

$$a = f\left(1 + \frac{1}{m}\right)$$

$$F = \frac{f}{D}$$

Here, let $\tau$ be the transmission factor of the lens, $\phi'_o$ be the entire light beam reaching the image plane $\Delta S'$, and Eo be the illumination of the image plane. Then, the following equations are established:

$$\phi'_o = \tau \phi_o$$

$$Eo = \frac{\phi'_o}{\Delta S'}$$

From these, $$Eo = \frac{\pi \tau Lo}{4F^2(1 + m)^2} \propto \frac{1}{(1 + m)^2}$$

Now, when the lens 2 is moved in the direction of arrow and the mirror 3 is moved while correcting the optical distance so as to maintain the imaging relation, the above-described predetermined distribution concerning the magnification m is formed in the scanning direction, but if setting is made such that the magnification m is small at the scanning start end, namely, at one end of the original, and the magnification is great at the other end of the original, then the illumination will be high at one end of the original with respect to the scanning direction and the illumination will gradually decrease toward the other end. If this illuminating system is used bilaterally symmetrically, the loss of light of the projection lens L due to the cosine biquadratic rule can be compensated for to thereby enable copying of uniform density. This system is achieved by moving lenses 2 and 2' in the direction of arrow. Now, let $m_1$ be the magnification at the end of the original and $m_2$ be the magnification at the central portion of the original, and assume that the ratio of the two magnifications is K, that is, $K=m_2/m_1$. Then, when K is about 0.5, the loss of quantity of light of the lens due to the cosine biquadratic rule is suitably compensated for. According to such illuminating system, the light beam is always converged during scanning and thus, a high brightness illumination is provided which is suited for a high-speed copying apparatus. The imaging principal ray passes through mirrors 3 and 3' to the projection lens L. The projection lens L is moved parallel to the original surface 4 to maintain the imaging position constant. Compensation for the cosine biquadratic rule in the direction perpendicular to the scanning direction may be achieved by setting the length of the filament of the cylindrically shaped light source so that the end portions thereof are longer than the central portion thereof, as is well-known. By this, illumination of uniform density over the entire picture plane becomes possible.

Figure 2:
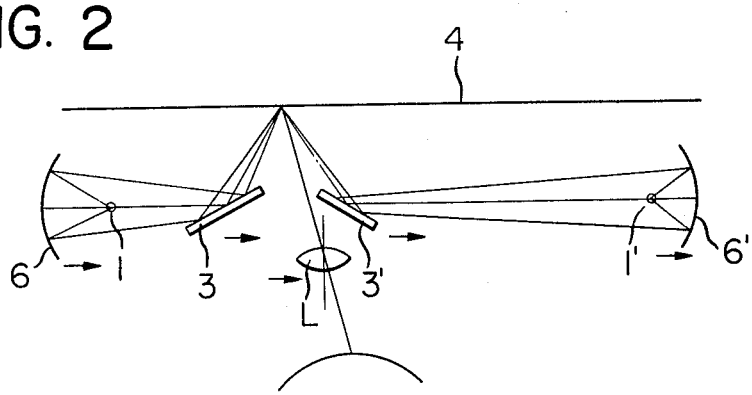
FIG. 2 illustrates a second embodiment of the present invention.

Reference is now had to FIG. 2 to describe a second embodiment of the present invention. The light beam emitted from a cylindrically shaped light source 1 fixed to one end portion of an original surface and reflected by a concave mirror 6 is imaged on the original surface 4 in a slit-like form via mirror 3.

The concave mirror 6 is initially far off from the light source 1 and is gradually moved toward the light source in parallel with to the original surface 4 and correspondingly, the mirror 3 is moved from one end portion of the original surface which is adjacent to the light source 1 toward the other end portion. Thus, the illumination distribution on the original surface 4 becomes higher at one end portion of the original surface which is adjacent to the light source 1 and gradually decreases toward the other end portion.

On the other hand, the light beam emitted from a light source 1' fixed to the other end portion of the original surface and reflected by a concave mirror 6' is imaged on the original surface 4 via a mirror 3'.

The concave mirror 6' initially lies near the light source 1' and is gradually moved away from the light source 1' and correspondingly, the mirror 3' is moved toward the light source 1'. Thus, the illumination distribution on the original surface becomes higher at one end portion of the original surface which is adjacent to the light source 1' and gradually decreases toward the other end.

If the illumination distributions formed by the light sources 1 and 1' on the original surface 4 with respect to the scanning direction are combined, there can be provided a distribution in which the so-called cosine biquadratic rule has been compensated for, namely, a distribution in which the illumination is higher at the opposite end portions of the original and lower at the central portion.

The imaging principal ray passes between the mirror 3 and the mirror 3' to the projection lens L.

Figure 3:
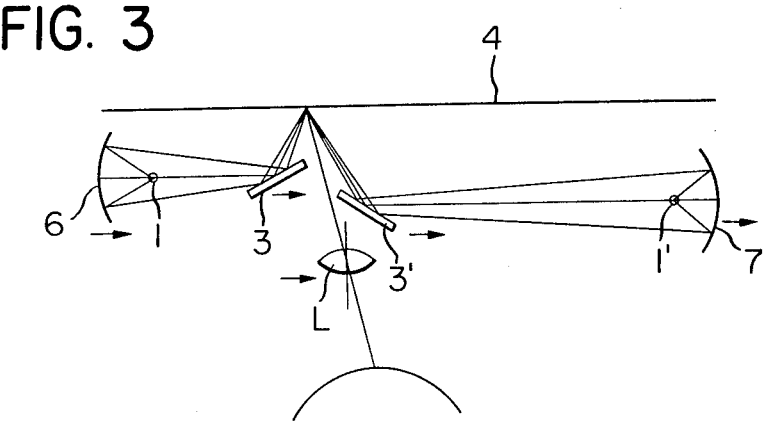
FIG. 3 illustrates a modification of the second embodiment.

FIG. 3 shows a modification of the second embodiment in which the level of a light source 1 and a concave mirror 6 from the original surface 4 is made different from the level of a light source 1' and a concave mirror 7 from the original surface 4. The asymmetry of the construction is compensated, for example, by changing the reflection factors of the mirrors. That is, if the reflection factor of the mirror 3' is increased as compared with the reflection factor of the mirror 3, there will be provided an illumination equivalent to a bilaterally symmetric illumination. A similar effect will also be provided if the reflection factors of the concave mirrors 6 and 7 are adjusted.

In the foregoing embodiments, the concave mirrors 6, 6' and 7 are not restrictive but use may be made of any mirrors of quadratic surface having an imaging function.

Also, the light sources 1 and 1' are not limited to cylindrical shape but may be spot light sources. In this latter case, it is desirable that the lens and concave mirrors be cylindrically shaped and the mirrors 3 and 3' be ones having a power in the direction perpendicular to the scanning direction.

The present invention is not limited to compensation for irregularity of quantity of light of the projection lens but is also applicable to compensation for irregularity of quantity of light of the other optical system in the light path.

According to the present invention, as has been described above, there can be provided a scanning illuminating device which enables copying of uniform density over the entire picture plane and which is suited for high-speed copying because of the fixed light sources.

What we claim is:

1. A scanning illuminating device in an image forming apparatus of the slit exposure scanning type, comprising:
a first fixed light source positioned in the vicinity of one end portion of an original surface;
a first imaging element movable in a predetermined direction with respect to said first light source while imaging said first light source upon the original surface in a slit-like form;
a first mirror movable with said first imaging element to correct the length of the light path so as to maintain an imaging relation so that reflected light scans the original surface;
a second fixed light source positioned in the vicinity of the other end portion of the original surface;
a second imaging element movable in a predetermined direction with respect to said second light source while imaging said second light source upon the original surface in a slit-like form; and
a second mirror movable with said second imaging element to correct the length of the light path so as to maintain an imaging relation so that reflected light scans the original surface while overlapping the area irradiated by said first mirror;
whereby the illumination distribution on the original surface in the scanning direction is formed into a distribution compensating for irregularity of quantity of light of the optical system.

2. A scanning illuminating device according to claim 1, wherein said first and second imaging elements are lenses.

3. A scanning illuminating device according to claim 1, wherein said first and second imaging elements are concave mirrors.

4. A scanning illuminating device, comprising:
a light source;
an imaging element movable in a predetermined direction with respect to said light source while imaging said light source upon a surface of an object; and
a reflector movable in association with said imaging element to correct the length of the light path so as to maintain an imaging relation to ensure that the reflected light scans the surface of the object;
whereby a predetermined illumination distribution is formed on the surface of the object in accordance with predetermined changes in the imaging magnification with respect to said light source.

* * * * *